United States Patent
Gabaev et al.

(10) Patent No.: US 10,536,482 B2
(45) Date of Patent: Jan. 14, 2020

(54) COMPUTER SECURITY ATTACK DETECTION USING DISTRIBUTION DEPARTURE

(71) Applicant: Microsoft Technology Licensing, LLC, Redmond, WA (US)

(72) Inventors: Yuri Gabaev, Givataim (IL); Elad Iwanir, Metar (IL); Gal Tamir, Avichayil (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 15/469,539

(22) Filed: Mar. 26, 2017

(65) Prior Publication Data

US 2018/0278647 A1    Sep. 27, 2018

(51) Int. Cl.
*H04L 29/06*    (2006.01)
*G06F 21/52*    (2013.01)

(52) U.S. Cl.
CPC .......... *H04L 63/1466* (2013.01); *G06F 21/52* (2013.01); *H04L 63/1425* (2013.01); *H04L 63/1458* (2013.01)

(58) Field of Classification Search
CPC ............. H04L 63/1466; H04L 63/1425; H04L 63/1458; G06F 21/52
USPC .......................................................... 726/23
See application file for complete search history.

(56) References Cited

U.S. PATENT DOCUMENTS

| | | |
|---|---|---|
| 6,321,338 B1 | 11/2001 | Porras et al. |
| 7,940,989 B2 | 5/2011 | Shi et al. |
| 8,880,541 B2 | 11/2014 | Hill et al. |
| 2003/0167402 A1 | 9/2003 | Stolfo et al. |
| 2008/0134333 A1 | 6/2008 | Shipp |

(Continued)

OTHER PUBLICATIONS

Iorliam, et al., ""Flow Size Difference" Can Make a Difference: Detecting Malicious TCP Network Flows Based on Benford's Law", In Journal of the Computing Research Repository, Sep. 2016, pp. 1-14.

(Continued)

*Primary Examiner* — Jason K Gee
*Assistant Examiner* — Angela R Holmes
(74) *Attorney, Agent, or Firm* — Ogilvie Law Firm

(57) ABSTRACT

Described technologies automatically detect computing system security attacks. Departure of occurrence distributions, which are based on leading digit(s) of digital item occurrence data, from model distributions that correspond to particular data sources, indicates a presence likelihood for particular attack types. Some model distributions exhibit Benford's Phenomenon. Described mechanisms detect security attack types such as ransomware, bitcoin mining, and others, using particular corresponding data sources such as file extensions, processor statistics, etc. Mechanisms detect security attacks without a captured baseline of healthy normal behavior, and without relying on malware code signatures. When an item occurrence distribution departs from a model distribution by at least a predefined degree, the technology electronically raises a security attack alert. Then countermeasures may be asserted for a possible type X security attack on the computing system. Countermeasures may include more computationally intensive tests for determining the precise extent or precise nature of an attack, for instance.

20 Claims, 7 Drawing Sheets

(56) References Cited

U.S. PATENT DOCUMENTS

| | | | |
|---|---|---|---|
| 2008/0172264 A1 | 7/2008 | Hoefelmeyer | |
| 2008/0208946 A1 | 8/2008 | Boritz et al. | |
| 2012/0096549 A1* | 4/2012 | Amini | H04L 63/1433 726/23 |
| 2015/0163242 A1* | 6/2015 | Laidlaw | G06F 21/552 726/22 |
| 2015/0172311 A1 | 6/2015 | Freedman et al. | |
| 2016/0330224 A1 | 11/2016 | Stolfo et al. | |
| 2017/0093885 A1* | 3/2017 | Houmb | G06F 21/57 |
| 2017/0324758 A1* | 11/2017 | Hart | H04L 63/1408 |
| 2017/0346851 A1* | 11/2017 | Drake | H04L 63/1466 |

OTHER PUBLICATIONS

Gottwalt, et al., "Natural Laws as a Baseline for Network Anomaly Detection", In Proceedings of IEEE TrustCom-BigDataSE-ISPA, Feb. 9, 2017, pp. 370-377.

Cho, et al., "Breaking the (Benford) Law Statistical Fraud Detection in Campaign Finance", In Journal of the American Statistician, vol. 61, Issue 3, Aug. 2007, 11 pages.

Chandola, et al., "Anomaly detection: A survey", In Journal of ACM Computing Surveys, vol. 41, Issue 3, Jul. 2009, 58 pages.

"Benford's law", retrieved from <<https://en.wikipedia.org/wiki/Benford's_law>>, Feb. 13, 2017, 14 pages.

"Zipf's law", retrieved from <<https://en.wikipedia.org/wiki/Zipf%27s_law>>, Feb. 15, 2017, 7 pages.

Dalai, et al., "Neutralizing SQL Injection Attack Using Sewer Side Code Modification in Web Applications", retrieved from <<https://www.hindawi.com/journals/scn/2017/3825373/>>, published Feb. 17, 2017, 11 pages.

"The Most Common Types of Cyber Security Attacks", retrieved from <<https://www.rapid7.com/fundamentals/types-of-attacks/>>, no later than Mar. 9, 2017, 8 pages.

"The 5 Most Common Security Attacks (and How to Guard Against Them)", retrieved from <<http://www.securityinnovationeurope.com/blog/the-5-most-common-security-attacks-and-how-to-guard-against-them>>, 2014, 6 pages.

Jaob, et al., "Behavioral detection of malware: from a survey towards an established taxonomy", retrieved from <<https://www.researchgate.net/publication/249498620_Behavioral_detection_of_malware_From_a_survey_towards_an_established_taxonomy>>, 2008, 17 pages.

Golbeck, "Benford's Law Applies to Online Social Networks", retrieved from <<http://journals.plos.org/plosone/article/file?id=10.1371/journal.pone.0135169&type=printable>>, 2015, 10 pages.

Andriotis, et al., "On Two Different Methods for Steganography Detection in JPEG Images with Benford's Law", retrieved from <<http://users.ics.forth.gr/~asko/pdfs/Conference%20Papers/2013/NATO%20SPI13.pdf>>, 2013, 10 pages.

Durtschi, et al., "The Effective Use of Benford's Law to Assist in Detecting Fraud in Accounting Data", retrieved from <<https://www.agacgfm.org/aga/fraudtoolkit/documents/benfordslaw.pdf>>, 2004, 18 pages.

Sekar, et al., "Specification-based Anomaly Detection: A New Approach for Detecting Network Intrusions", retrieved from <<https://pdfs.semanticscholar.org/eaf4/9d3f7b761fd641e6f45886bf90a963c336fb.pdf>>, 2002, 10 pages.

"Introduction to Azure Security Center", retrieved from <<https://docs.microsoft.com/en-us/azure/security-center/security-center-intro>>, Nov. 16, 2016, 22 pages.

"Top-ranked CASB: What is a Cloud Access Security Broker?", retrieved from <<https://www.netskope.com/company/about-casb/>>, no later than Mar. 9, 2017, 6 pages.

"Google Drive", retrieved from <<https://en.wikipedia.org/wiki/Google_Drive>>, Mar. 7, 2017, 14 pages.

"Dropbox (service)", retrieved from <<https://en.wikipedia.org/wiki/Dropbox_(service)>>, Mar. 7, 2017, 15 pages.

"Bitcoin network", retrieved from <<https://en.wikipedia.org/wiki/Bitcoin_network>>, Feb. 10, 2017, 5 pages.

"2—Hardware Requirements—The Ultimate Bitcoin Mining Tutorial", retrieved from <<http://utimatebitcointutorial.blogspot.com/2011/12/hardware-requirements_30.html>>, 2011, 3 pages.

Sadequl, "Windows Logging Basics—Ultimate Guide to Logging", retrieved from <<https://www.loggly.com/ultimate-guide/windows-logging-basics/>>, no later than Mar. 14, 2017, 53 pages.

"Monitoring Processes, Services, and Events", retrieved from <<https://msdn.microsoft.com/en-us/library/bb726964.aspx>>, no later than Mar. 14, 2017, 11 pages.

Gite, "Show All Running Processes in Linux", retrieved from <<https://www.cyberciti.biz/faq/show-all-running-processes-in-linux/>>, updated Jan. 12, 2017, 43 pages.

"Filename extension", retrieved from <<https://en.wikipedia.org/wiki/Filename_extension>>, Mar. 10, 2017, 5 pages.

"Intrusion detection system", retrieved from <<https://en.wikipedia.org/wiki/Intrusion_detection_system>>, Mar. 8, 2017, 10 pages.

"Host-based intrusion detection system", retrieved from <<https://en.wikipedia.org/wiki/Host-based_intrusion_detection_system>>, Mar. 6, 2017, 4 pages.

"Load (computing)", retrieved from <<https://en.wikipedia.org/wiki/Load_(computing)>>, Feb. 10, 2017, 5 pages.

"mpstat", retrieved from <<https://en.wikipedia.org/wiki/Mpstat>>, Jan. 15, 2015, 2 pages.

"Advanced persistent threat", retrieved from <<https://en.wikipedia.org/wiki/Advanced_persistent_threat>>, Mar. 14, 2017, 6 pages.

Krugel, et al., "Service Specific Anomaly Detection for Network Intrusion Detection", Retrieved From:http://citeseerx.ist.psu.edu/viewdoc/download?doi=10.1.1.93.843&rep=rep1&type=pdf, Apr. 30, 2002, 9 Pages.

"International Search Report and Written Opinion Issued in PCT Application No. PCT/US12/39769PCT/US18/022286", dated May 16, 2018, 19 Pages.

Wang, et al., "Anomalous Payload-Based Network Intrusion Detection", In Proceedings of RAID 2004, LNCS 3224, Sep. 15, 2004, pp. 203-222.

* cited by examiner

SECURITY ATTACK TYPES 312:
RANSOMWARE ATTACK TYPE 402,
DISTRIBUTED DENIAL OF SERVICE (DDOS) ATTACK TYPE 404,
BITCOIN MINING ATTACK TYPE 406,
PROCESSING THEFT ATTACK TYPE 408,
PHISHING ATTACK TYPE 410,
SQL INJECTION ATTACK TYPE 412,
BREACH ATTACK TYPE 414,
OTHER ATTACK TYPE 416, ...

EXAMPLE ATTACK DETECTION METHOD 500

| Count | Name | First | | Count | Name | First | | Digit | Frequency |
|---|---|---|---|---|---|---|---|---|---|
| 2340 | 4624 | 2 | | 1497 | 4660 | 1 | | 1 | 15 |
| 1156 | 4648 | 1 | | 3 | 4905 | 3 | | 2 | 8 |
| 38484 | 4658 | 3 | | 1 | 8222 | 1 | | 3 | 6 |
| 7918 | 4663 | 7 | | 3 | 4904 | 3 | | 4 | 4 |
| 37225 | 4656 | 3 | | 12 | 5140 | 1 | | 5 | 4 |
| 18941 | 4690 | 1 | | 9 | 4625 | 9 | | 6 | 3 |
| 11088 | 4689 | 1 | | 3 | 4797 | 3 | | 7 | 3 |
| 11178 | 4688 | 1 | | 2 | 4776 | 2 | | 8 | 2 |
| 4161 | 4670 | 4 | | 1 | 4699 | 1 | | 9 | 2 |
| 53 | 4611 | 5 | | 1 | 5633 | 1 | | | |
| 302 | 4672 | 3 | | 7 | 4697 | 7 | | | |
| 2149 | 4634 | 2 | | | | | | | |
| 152 | 4702 | 1 | | | | | | | |
| 96 | 4735 | 9 | | | | | | | |
| 7677 | 4662 | 7 | | | | | | | |
| 55 | 4798 | 5 | | | | | | | |
| 261 | 4957 | 2 | | | | | | | |
| 611 | 4946 | 6 | | | | | | | |
| 611 | 4948 | 6 | | | | | | | |
| 168 | 5059 | 1 | | | | | | | |
| 569 | 5061 | 5 | | | | | | | |
| 569 | 5058 | 5 | | | | | | | |
| 1443 | 4985 | 1 | | | | | | | |
| 1430 | 4664 | 1 | | | | | | | |
| 20 | 4801 | 2 | | | | | | | |
| 20 | 4800 | 2 | | | | | | | |
| 8 | 4803 | 8 | | | | | | | |
| 4 | 4732 | 4 | | | | | | | |
| 4 | 4733 | 4 | | | | | | | |
| 279 | 4799 | 2 | | | | | | | |
| 2 | 4954 | 2 | | | | | | | |
| 6 | 4953 | 6 | | | | | | | |
| 4 | 4657 | 4 | | | | | | | |
| 8 | 4802 | 8 | | | | | | | |
| 1 | 4701 | 1 | | | | | | | |
| 1 | 4700 | 1 | | | | | | | |

OCCURRENCE DATA     OCCURRENCE DISTRIBUTION

Fig. 10

COMPUTER SECURITY ATTACK DETECTION USING DISTRIBUTION DEPARTURE

BACKGROUND

Noon Attacks on computing system security have different levels of detectability. Some attacks on computing system security have consequences which are relatively easy to detect, such as distributed denial of service (DDOS) attacks or physical attacks such as bombs, earthquakes, or power grid shutdowns. Other attacks are surreptitious, such as data theft or malware infection, and their consequences may go undetected for a long time or until a large portion of the computing system is implicated, or both. Note that the word "attack" is used broadly herein to cover both intended threats (e.g., bombs, DDOS attacks) and unintended threats (e.g., earthquakes, software bugs) to the desired and authorized operation of the computing system. Note also that detecting the consequences of an attack is not necessarily identical with detecting the nature of the attack, much less detecting the source of the attack.

Attacks on computing system security also take many different forms. Some attacks rely mainly or entirely on overcoming, tricking, or evading software protections, such as anti-malware software or firewalls or encryptions. Other attacks rely in some critical way on overcoming, tricking, or evading human precautions, such as the prevalent human suspicion of email which presents an offer that seems too good to be true.

New attacks on computer security are continually being developed and put into use by criminal, malicious, or underground individuals and organizations. As computing systems continue to grow in size, in complexity, and in their fields of use, new vulnerabilities emerge. Accordingly, new technologies for detecting attacks on computing system security are worth careful consideration.

SUMMARY

Some technologies described herein are directed to the technical activity of automatically detecting an attack on the security of a computing system, namely, unauthorized or abnormal usage of computing resources. Technical mechanisms are described for detecting particular types of security attacks using particular data sources, for detecting security attacks without a captured baseline of actual normal behavior, for detecting attacks without relying on malware code signatures, and other examples. Other technical activities pertinent to teachings herein will also become apparent to those of skill in the art.

Some examples provided herein are directed to improved computer security technology which electronically extracts digital item occurrence data which represents occurrences of instances of digital items in a computing system. By execution of processor instructions or the operation of special-purpose hardware, or both, the technology obtains an item occurrence distribution from the occurrence data and checks the item occurrence distribution for departure from a model distribution for a type X of computer security attacks. When the item occurrence distribution departs from the model distribution by at least a predefined degree, the technology electronically raises a security attack alert. Then countermeasures may be asserted for a possible type X security attack on the computing system. Countermeasures may include more computationally intensive tests for determining the precise extent or precise nature of an attack, and operations to quarantine or clean infected portions of the computing system, for instance.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 10 shows two tables, namely, a table of occurrence data and a corresponding table with an occurrence distribution based on the occurrence data.

DETAILED DESCRIPTION

Overview

Figure 1:
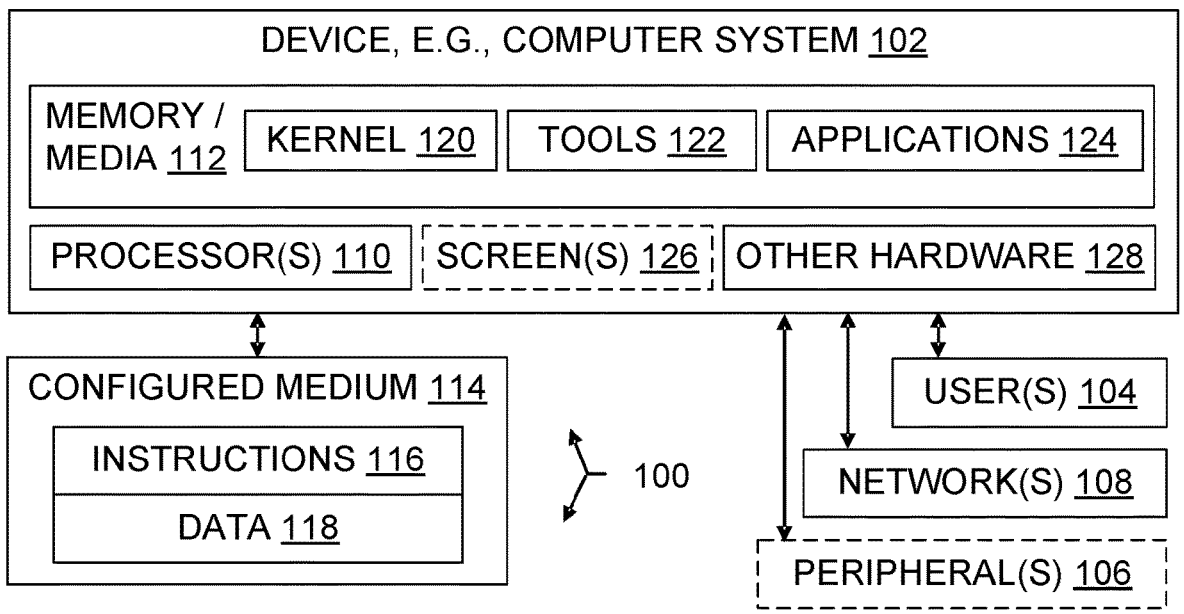
FIG. 1 is a block diagram illustrating a computer system having at least one processor, at least one kernel such as an operating system, and at least one memory, which interact with one another, and also illustrating a configured storage medium.

Detecting attacks on the users of a computing system and detecting attacks on an organization's network are difficult tasks. Many companies and other organizations try to detect attacks in various ways. One advantage of the innovations presented here is that they are compatible with familiar attack detection mechanisms, and often less computationally intensive than those familiar mechanisms. For instance, familiar mechanisms that use machine learning to identify suspicious activity or examine network packets to identify suspicious traffic can be very expensive computationally, and their complexity frequently imposes substantial administrative overhead and corresponding personnel costs. Accordingly, embodiments of the present teachings can be used as an efficient initial test or scan, to be followed up with more intensive and expensive tests and scans when possible attacks are detected by the present embodiments.

One of the most harmful attacks on organizations are attacks from an advanced persistent threat (APT). Such attacks occur when an attacker gains access to the organization's digital resources surreptitiously, and then extracts data silently over a long period of time, such as weeks or months, or even years. In one study noted in a Wikipedia article "Advanced persistent threat" the average period over which attackers controlled at least part of a victim's network was one year, and the longest period was almost five years.

Attacks from an APT are an example of low-and-slow attacks. Low-and-slow attacks are attacks in which the unauthorized activity events occur in relatively low amounts compared with legitimate activity (e.g., under 2% within logs) and at a relatively slow rate (e.g., less than 1% of activity over a given period of at least an hour) as time passes. This kind of attack is hard to detect. But innovations described herein provide another layer of detection which can detect some low-and-slow attacks because the camouflage they use presumes a normal traffic rate or activity baseline and the innovations look for departures using data sources other than the ones used as camouflage.

Some innovations described herein provide security attack detection using data analysis which is relatively simple and requires relatively little computing power. Some provide useful applications in computer security of a phenomena that is commonly known as Benford's Law.

Note that the word "Law" in "Benford's Law" is a misnomer. It is not an accurate label for the phenomenon in question. Despite the word "Law" in its popular name, this phenomenon is not a law of nature, such as the law of gravity or Ohm's Law (current equals voltage divided by resistance). Nor is this phenomenon a law of mathematics or a fundamental principle of mathematics. The Commutative Law of mathematics, for instance, holds that a+b=b+a regardless of which numbers are assigned to a and b. By contrast, the phenomenon referred to as Benford's Law does not hold true for every set of numbers. It has been observed in some data sets, and has been found missing from other data sets. Accordingly, the present disclosure departs from common usage by favoring the more accurate label "Benford's Phenomenon". Similarly, a phenomenon commonly referred to as "Zipf's Law", which may be viewed as a generalization of Benford's Phenomenon, is referred to herein as "Zipf's Phenomenon" because it also does not apply universally. Zipf's Phenomenon occurs in a body of natural language utterances when the frequency of any word is inversely proportional to its rank in the body's frequency table.

Benford's Phenomenon can be described in various ways. Which description applies in a given situation will be clear to one of skill from the language used, and from the understanding that the following description applies as the default: Benford's Phenomenon occurs in a data set of occurrences when the distribution of leading digits matches a probability distribution in which the probability of a digit d, denoted P(d), is proportional to the distance between d and d+1 on a logarithmic scale.

Another description, which may override the default, is that Benford's Phenomenon occurs when one measures events, takes the most significant digit from each of the measurements, and observes that these taken digits are distributed non-uniformly with the low value digits appearing more and the higher digits appearing less, in or near the following proportions:

TABLE 1

Benford's Phenomenon Digit Distribution

| Digit d | Proportion |
| --- | --- |
| 1 | 30.1% |
| 2 | 17.6% |
| 3 | 12.5% |
| 4 | 9.7% |
| 5 | 7.9% |
| 6 | 6.7% |
| 7 | 5.8% |
| 8 | 5.1% |
| 9 | 4.6% |

Departure from the Benford's Phenomenon Digit Distribution may be measured as a percentage of the stated proportion. Thus, a plus or minus ten percent departure allows a proportion for digit 1 in the range from (30.1−0.1*30.1)% to (30.1+0.1*30.1)%, a proportion for digit 2 in the range from (17.6−0.1*17.6)% to (17.6+0.1*17.6)%, and so on. Similarly, a plus or minus five percent departure allows a proportion for digit 1 in the range from (30.1−0.05*30.1)% to (30.1+0.05*30.1)%, a proportion for digit 2 in the range from (17.6−0.05*17.6)% to (17.6+0.05*17.6)%, and so on. Departure may also be measured using familiar measures of statistical distance or divergence, such as those utilizing Jeffrey's divergence, a Chernoff coefficient, Hellinger distance, Kullback-Liebler divergence, other f-divergences, a Bhattacharyya coefficient, or other familiar measures of distance between distributions.

Figure 9:
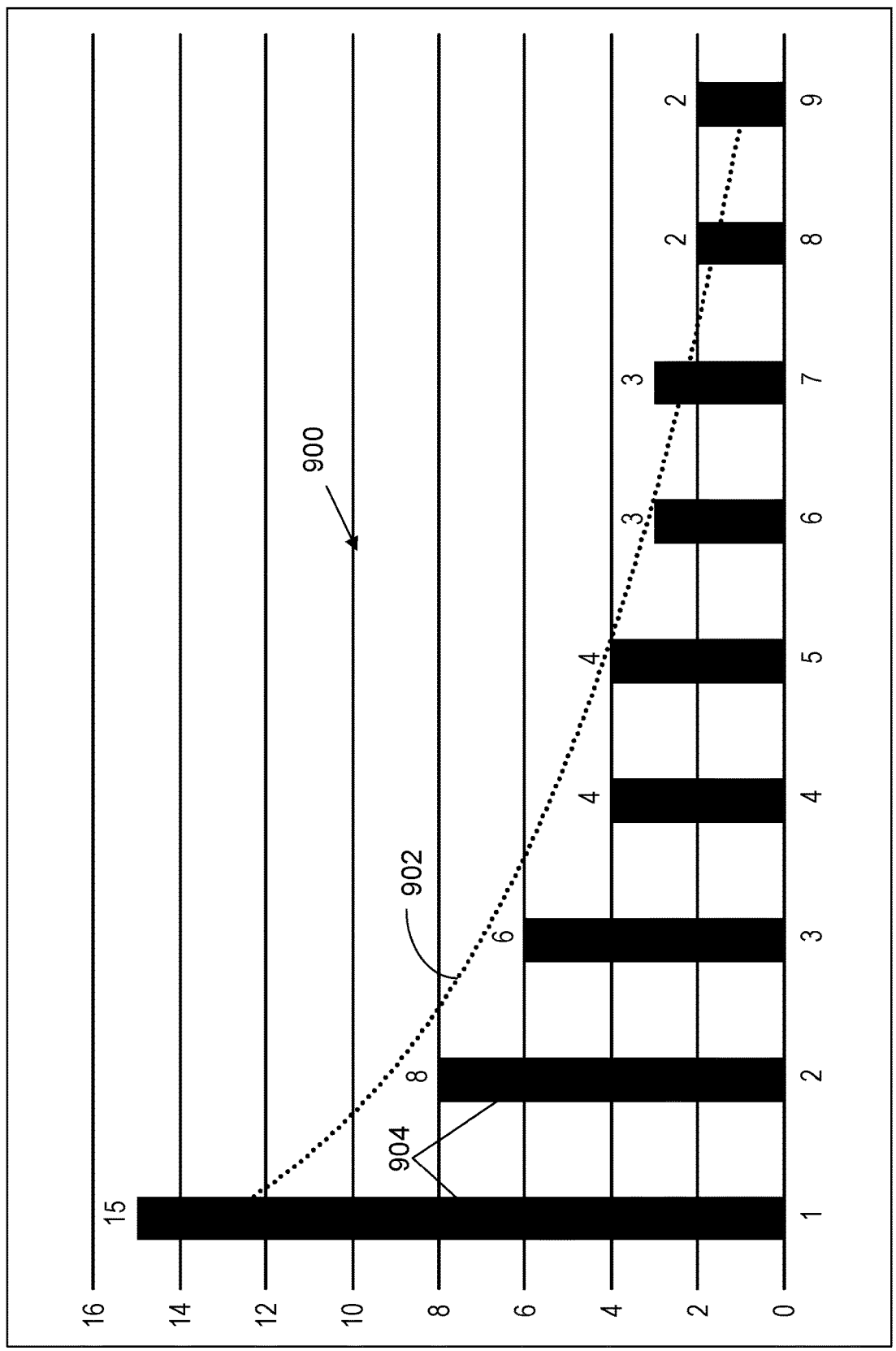
FIG. 9 is a graph illustrating an example model distribution and an example occurrence distribution which is based on data in FIG. 10.

FIGS. 9 and 10 provide one of many possible specific examples.

Occurrence data in the left side of FIG. 10 includes a "Count" column listing the number of instances of process IDs ("Name" column) on a computer system. The "First" column shows the first digit of the number of occurrences (instances) of a given process ID. The right side of FIG. 10 shows a frequency distribution, a.k.a. an "occurrence distribution", derived from the data in the "First" column. The illustrated occurrence distribution is a distribution of first digits of occurrence instance counts. The occurrence distribution is graphed in FIG. 9, where it is shown as bar graph bars 904. Also shown is a dotted line 902 indicating a model distribution that conforms with Benford's Phenomenon. This visual comparison 900 shows that the occurrence distribution 904 departs somewhat from the model Benford's Phenomenon distribution 902. The extent of the departure could be calculated using familiar statistical distance or divergence metrics, as discussed above.

Some embodiments described herein leverage Benford's Phenomenon for particular pairings of data sources with security attack types. Occurrence data extracted from data sources on a given machine are compared to a model baseline distribution which conforms with Benford's Phenomenon. The inventors expect security attack events to change occurrence distributions in ways that depart from the model distribution, and different types of attacks to correlate with departures in different kinds of occurrence data.

As to measureable events and other data, some embodiments use events data which measures the number of occurrences for each event id. Some use data representing the number of occurrences for each file type (e.g., extension) on a machine's disk. Some use performance counter values, including those with absolute values rather than relative ones, such as networking bytes received per second, bytes sent per second, bytes written to memory, and bytes read from memory. Some use process data, such as that maintained by an operating system. Other examples of occurrence data are also discussed herein.

Some embodiments are very effective in terms of detection success rate and very efficient in terms of resource consumption. Security attack detection as taught herein can be readily implemented and easily administered. For example, some embodiments computing in real time a new distribution of the measureable items (e.g., event ids, file types, performance counters) and compare them to the Benford's Phenomenon model as a baseline.

Some embodiments described herein may be viewed in a broader context. For instance, concepts such as departure, detection, distribution, and security may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving departure, detection, distribution, or security are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in computing technology, such as detecting unauthorized or abnormal use of processing hardware, detecting unauthorized or abnormal use of a file system, and detecting unauthorized or abnormal use of a computer network. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein monitor particular computing conditions such as occurrence distributions which are derived from occurrence data maintained by operating systems. Third, technical effects provided by some embodiments include efficient detection of security attacks without reliance on baseline occurrence data from a healthy computing system, and detection of low and slow attacks on computer system security. Fourth, some embodiments include technical adaptations such as attack detection technology including mappings between attack types and data sources, and model distributions correlated with attack types. Fifth, technical advantages of some embodiments include reduced computing requirements since the baseline used is an easily computed model distribution, and compatibility with existing attack detection mechanisms which permits use of the present innovations as an efficient initial warning mechanism. Other advantages will also be apparent to one of skill from the description provided.

Acronyms and Abbreviations

Some acronyms and abbreviations are defined below. Others may be defined elsewhere herein or require no definition to be understood by one of skill.
ALU: arithmetic and logic unit
API: application program interface
APT: advanced persistent threat
APP: application
ASCII: American Standard Code for Information Interchange
BIOS: basic input/output system
CD: compact disc
CPU: central processing unit
DDOS: distributed denial of service
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
IP: internet protocol
NVRAM: non-volatile random access memory
OS: operating system
RAM: random access memory
ROM: read only memory
SMS: short message service
SQL: structured query language
URL: uniform resource locator
XML: extensible markup language Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a cloud computing environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as extracting occurrence data, performing calculations to obtain an occurrence distribution, performing calculations to check for the presence and size of a departure of an occurrence distribution from a model distribution, and electronically raising alerts, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as asserting, avoiding, awaiting, checking, detecting, extracting, getting, maintaining, mapping, obtaining, raising, sending, snapping, using (and asserts, asserted, avoided, avoids, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figures 4, 5:
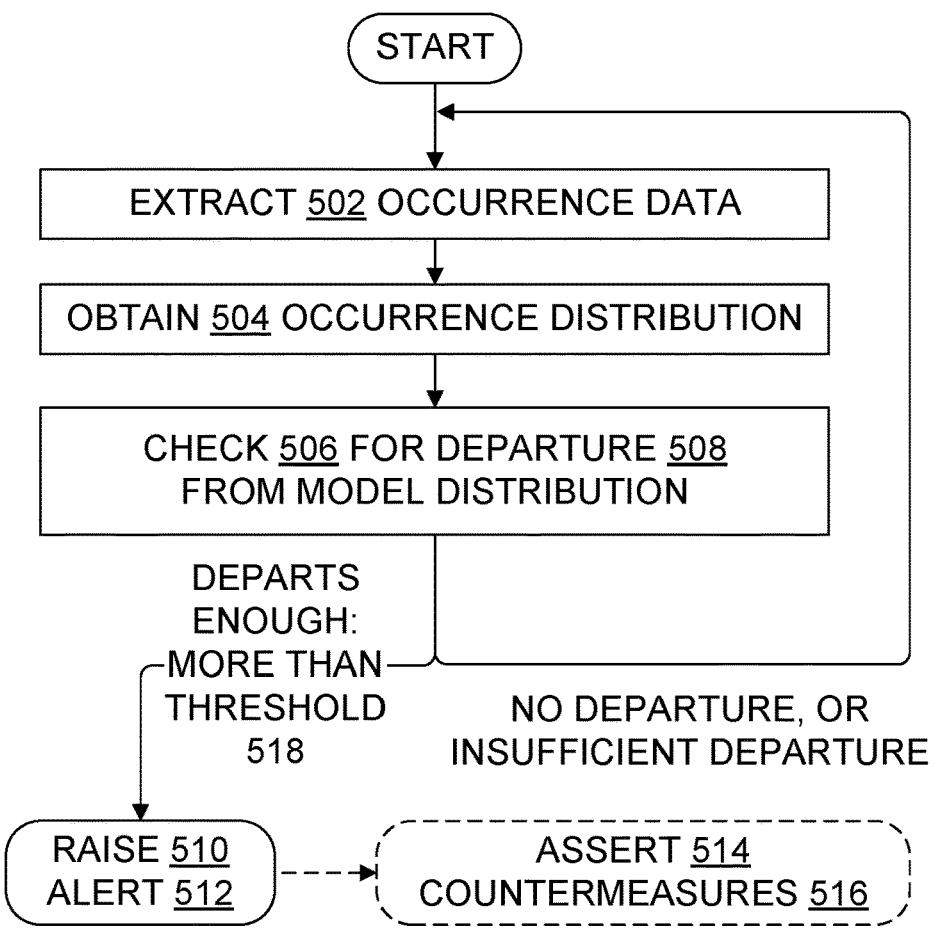
FIG. 4 is a block diagram illustrating several types of attacks on computer system security.
FIG. 5 is a flowchart illustrating a method for detecting attacks on computer system security.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as computational system or computing system
- 104 users
- 106 peripherals
- 108 network
- 110 processor
- 112 computer-readable storage medium, e.g., RAM, hard disks
- 114 removable configured computer-readable storage medium
- 116 instructions executable with processor; may be on removable media or in other memory (volatile or non-volatile or both)
- 118 data
- 120 kernel(s), e.g., operating system(s), BIOS, device drivers
- 122 tools, e.g., anti-virus software, firewalls, packet sniffer software
- 124 applications, e.g., word processors, web browsers, spreadsheets
- 126 display screens
- 128 computing hardware not otherwise associated with a reference number 106, 108, 110, 112, 114
- 200 data sources
- 202 file system
- 204 data records generally; may be kept in tables, data bases, files, linked data structures, lists, or other formats; may be stored in volatile or non-volatile memory or both (but is digital regardless); may be human-readable or not
- 206 file
- 208 file name
- 210 extension portion of file name, e.g., .sys, .doc, .dat, etc.
- 212 type identifier associated with a file; may replace or supplement extension
- 214 network usage statistics
- 216 statistics on IP addresses, e.g., number of IP addresses allocated, number of IP addresses in use, numeric values specifying particular IP addresses
- 218 statistics on ports, e.g., number of ports allocated, number of ports in use, numeric values specifying particular ports
- 220 statistics on bandwidth, e.g., available bandwidth, bandwidth used
- 222 statistics on packets, e.g., number of packets sent, number of packets received, contents and statistics of particular fields in packets
- 224 statistics on processor usage, e.g., utilization percentage, idle time, blocked time, average load
- 226 CPU or general purpose processor, as opposed to GPU or numeric coprocessor, for example
- 228 statistics on CPU or general purpose processor usage
- 230 GPU
- 232 statistics on GPU usage
- 234 statistics on peripheral device usage, e.g., bytes sent to peripheral, bytes received from peripheral, time peripheral spent idle, time peripheral spent blocked
- 236 statistics on memory usage, e.g., bytes allocated, bytes free, average bytes allocated, average bytes free, size of allocation above a specified amount, average size of allocation
- 238 working memory, namely, memory that is currently allocated to a running or suspended process; working memory is generally in RAM but may be paged to disk by a virtual memory manager
- 240 statistics on working memory usage
- 242 volatile memory, e.g., RAM that is not backed by a battery
- 244 statistics on volatile memory usage
- 246 non-volatile memory, e.g., disk, NVRAM
- 248 statistics on non-volatile memory usage
- 250 message between computing processes, e.g., email message, SMS message, URL, XML, or other message
- 252 statistics on message usage or message content or both
- 254 human-readable text string, e.g., string in ASCII or Unicode
- 256 statistics on human-readable text string usage or content or both
- 258 malicious character sequence, e.g., escape sequence to insert SQL commands into URL or user response, SQL commands in URL or user response where such commands are not typical
- 260 statistics on malicious character sequence usage or malicious character sequence content or both
- 262 file system statistics
- 302 computer system equipped with attack detection technology
- 304 individual machine (an example of a computer system)
- 306 item occurrence data, e.g., raw data maintained by kernel, such as process ID occurrence data in the example on the left side of FIG. 10
- 308 model distributions, e.g., distributions which conform with Benford's Phenomenon
- 310 list of security attack types, e.g., as shown in FIG. 4; may be implemented with a table, list, enumeration, or other software construct
- 312 security attack type, e.g., ransomware attack type, DDOS attack type, etc.
- 314 mapping between security attack type and data source; may be implemented as jump table, switch statement, lookup table, or other software construct; example mappings are called out in the description and claims, e.g., ransomware attack type is mapped to file type extension 210 data such as data in file system inode data structures
- 316 attack detection software
- 318 attack detection technology, namely, one or more model distributions plus a list of one or more security attack types plus a mapping between security attack type and data source
- 320 attack detection engine, namely, attack detection software plus at least one processor capable of executing the attack detection software
- 322 occurrence distribution obtained from occurrence data, e.g., the occurrence distribution shown in the example on the right side of FIG. 10
- 324 communication from attack detection engine, e.g., as XML, SMS, email, or other message, specifying, e.g., type of security attack detected, level of confidence detected attack is actually underway (e.g., whether independently verified using a familiar but computationally intensive mechanism), and an estimate of the attack's extent (e.g., 10% of filenames altered, size of departure from model distribution, etc.)

326 security center software or service in cloud or other environment, e.g., a cloud access security broker, or a security information and event manager 328 digital items, namely, items which are in a computing system and for which instance data is maintained 402 ransomware attack type; ransomware is malware that threatens the availability of data to authorized users or the disclosure of data to unauthorized parties, or both 404 DDOS attack type; a DDOS attack overloads computing resources to interfere with their availability for normal use 406 bitcoin mining attack type; this attack makes unauthorized use of a computing system to perform bitcoin mining computations 408 processing theft attack type; these attacks make unauthorized use of a computing system's processing capability, thereby denying use of the processors to authorized processes; two of the many examples are bitcoin mining and spam production 410 phishing attack type; phishing attempts to obtain passwords or other confidential information by deceiving human users 412 SQL injection attack type; these attacks inject unauthorized SQL commands into messages 414 breach attack type; these attacks inject malware into a computing system 416 other attack types not covered by any referenced items 402-414

500 example attack detection method 502 extract occurrence data, e.g., read directly from kernel records or read from a snapshot or other copy of the data from the kernel records 504 obtain an occurrence distribution from the occurrence data, e.g., by tallying the frequency of items in the occurrence data and then calculating the distribution of one (or another specified number) of leading digits in the tallied frequency 506 check for departure of the occurrence distribution from a model distribution, e.g., use a processor to calculate a statistical distance, percentage difference, or other measure taught herein 508 departure of the occurrence distribution from the model distribution; may be specified in detail as a numeric value indicating statistical distance, percentage difference, or other measure taught herein, or may be specified simply as sufficient or insufficient to raise an alert directly or to send an alert communicate to a security center 510 raise an alert, e.g., send a message to a security center or directly to an administrator 512 alert, e.g., message to a security center or an administrator 514 assert countermeasures to a detected security attack are prudent or necessary 516 countermeasures to a security attack 518 threshold determining whether departure is large enough for alert 600 flow diagram of example attack detection method 602 software routine which specifies the type of attack to check for; this may prioritize some attack type checks over others and may set a schedule, e.g., check for ransomware attacks every ten minutes, check for bitcoin mining attacks daily, and check for phishing attacks every one thousand emails 604 data structure which specifies the type of attack to check for, e.g., a list or table with a pointer or index identifying the next type of attack to check 606 get an attack type selection, e.g., from a user through a user interface, or as an automatic selection from a routine or data structure 608 attack type selection, e.g., one of the attack types in FIG. 4

610 snapshot of occurrence data, including at least the occurrence data and a timestamp indicating when the occurrence data was snapped 612 take a snapshot of occurrence data 614 await next command to attack detection engine, e.g., next selection of attack type to check or next command to refresh occurrence data snapshot 616 attack detection engine command, e.g., check for specified attack type, refresh occurrence data snapshot, edit mapping of attack types to data sources 618 administrator; this is an example of a user 702 personal, public, or other cloud service 704 file hosting service 706 file storage and synchronization service 800 general flowchart of attack detection measures and related steps 802 avoid reliance on any use of an uninfected system's measured activity as a baseline in order to perform attack detection method 804 avoid reliance, in order to perform an attack detection method taught herein, on any use of ant-malware software such as anti-virus or firewall software that does not compare occurrence distributions to model distributions 806 avoid reliance on any use of malware signatures in order to perform attack detection method 808 detect an attack on computer system security 810 detect a low and slow attack on computer system security, namely, an attack whose operations are less than 2% of all obtained occurrence data and whose operations occur over at least two weeks prior to detection 812 use a model distribution which conforms with the Zipf Phenomenon 814 use a model distribution which conforms with the Benford Phenomenon 816 a distribution which conforms with the Zipf Phenomenon 818 a distribution which conforms with the Benford Phenomenon 820 send a communication to a cloud or network security center 822 maintain occurrence data; normally done by kernel(s)

824 detect an attack which exploits or attempts to exploit a zero-day vulnerability 826 zero-day vulnerability 828 refine the mapping between security attack types and sources in view of experimental feedback indicating which sources correlate best with which types of attack; this may include adding, modifying, or deleting security attack types and adding, modifying, or deleting specification of the sources to use 900 comparison of occurrence distribution to model distribution
902 graph of model distribution
904 graph of occurrence distribution Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may include integrated NUI or voice command functionality, for example. A GUI may be generated on a local desktop computer, or on a smart phone, for example, or it may be generated from a web server and sent to a client device 102.

Natural user interface (NUI) operation may use peripherals 106 or other hardware 128 for speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Data Sources

Figure 2:
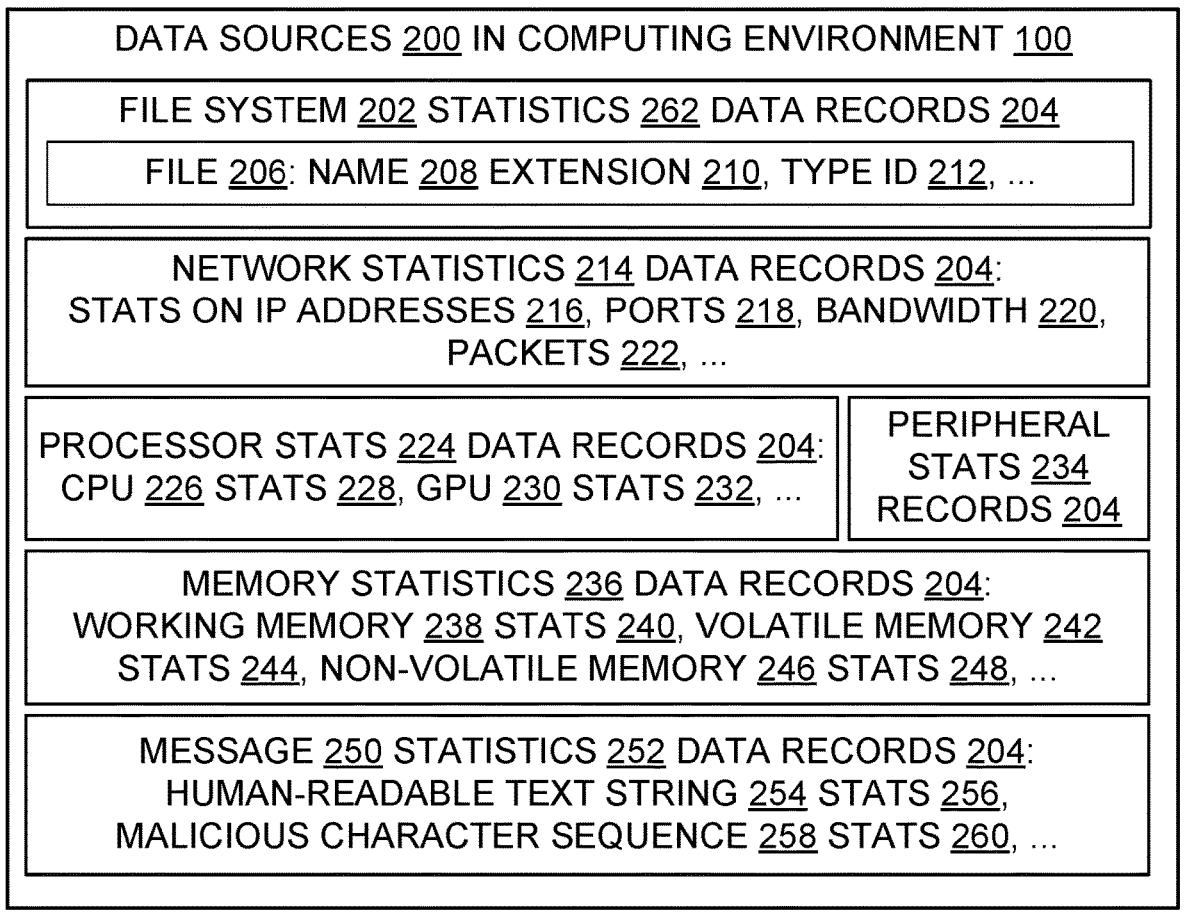
FIG. 2 is a block diagram illustrating aspects of data sources in a computing environment such as an environment containing one or more computing systems.

FIG. 2 illustrates data sources 200 which may be mapped to security attack types. Examples shown include file system 202 records, network statistics 214, processor statistics 224, peripheral usage statistics 234, memory usage statistics 236, and message statistics 252. File system 202 data 262 includes, e.g., data on the names 208, extensions 210, and other type identifiers 212 of files 206. File system data is routinely maintained (i.e., gathered and updated) by most kernels 120. Network data 214 includes, e.g., data 216 on IP addresses, data 218 on ports, data 220 on bandwidth, and data 222 on packets. Network data is routinely maintained by kernels 120 or network utilities 122 or profilers 122. Processor data 224 includes, e.g., data 228 on CPUs 226 and data 232 on GPUs 230. Processor data is routinely maintained by kernels 120 or profilers 122. Peripheral data 234 includes data on usage of peripherals 106. Peripheral data is routinely maintained by kernels 120, device drivers (which may be considered part of a kernel or a separate item 122), and other software. Memory data 236 includes, e.g., data 240 on working memory 238, data 244 on volatile memory 242, and data 248 on non-volatile memory 246. Memory data is routinely maintained by kernels 120 or profilers 122. Message data 252 includes, e.g., data 256 on messages 250 which contain human-readable text strings 254, and data 260 on messages which contain malicious character sequences 258. Message data can be maintained by tools 122 or by the attack detection software 316. Indeed, in some embodiments some of the data sources 200 include data that is maintained by the attack detection software 316.

Systems

Figure 3:
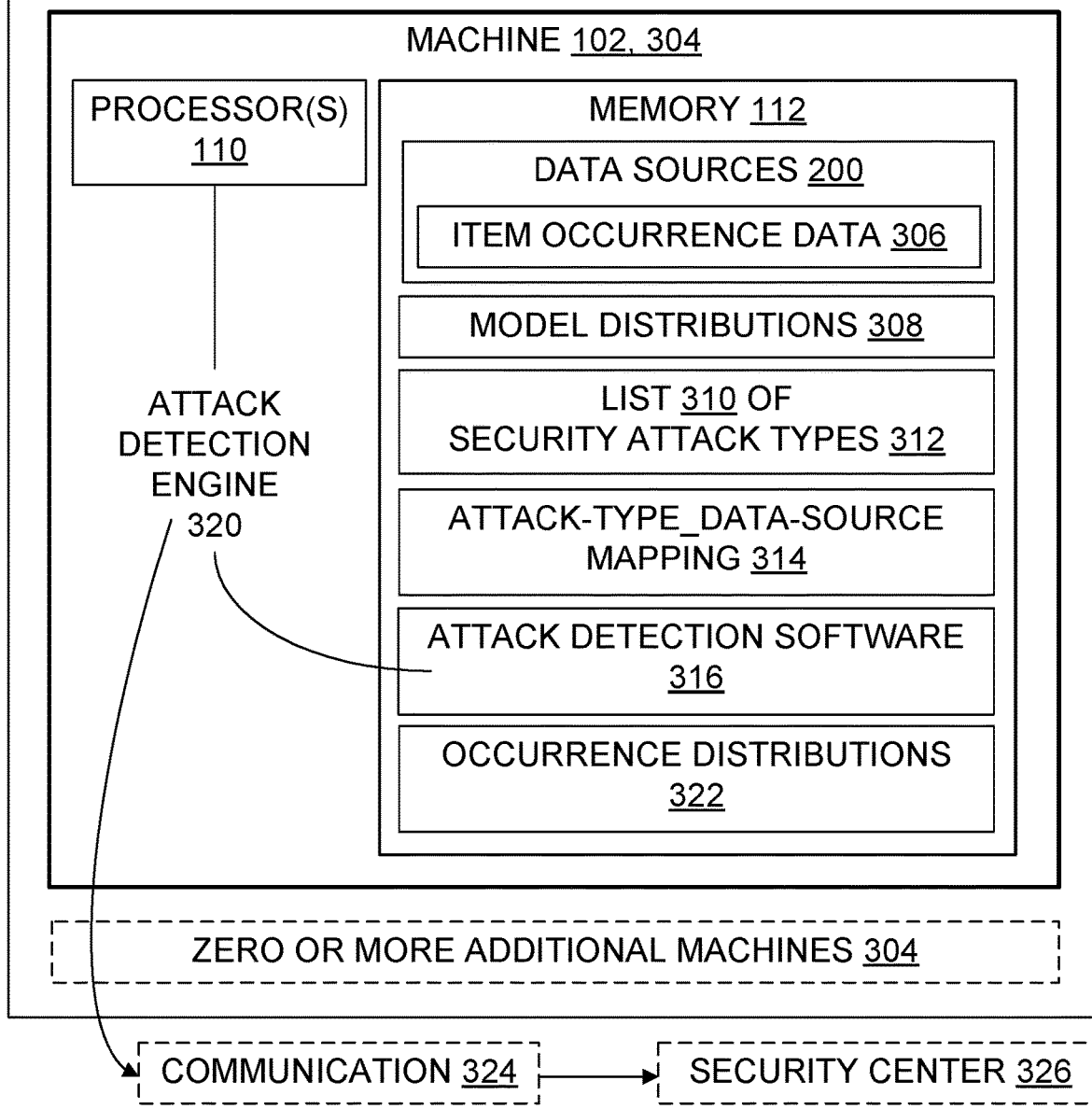
FIG. 3 is a block diagram illustrating aspects of a computer system equipped with attack detection technology.

FIG. 3 illustrates a computing system 302 equipped for attack detection. The system includes at least one particular machine 304 that is equipped with attack detection technology 318. System 302 is an example of system 102, but reference number 302 is used to indicate that attack detection technology 318 is present. Machine 304 is an example of system 102, but reference number 304 is used to indicate that a single machine (as opposed to a network or cluster) is being discussed.

The illustrated attack detection technology 318 includes one or more model distributions 308, a list 310 of at least one security attack type 312 (e.g., from FIG. 4), an attack-type_data-source mapping 314, and an attack detection engine 320. The attack detection engine 320 includes a processor 110 and detection instructions 116 of the attack detection software 316. The detection instructions 116 of the attack detection software 316 implement an algorithm such as the algorithm illustrated in FIG. 5, the algorithm illustrated in FIG. 6, or another attack detection algorithm taught herein.

In the FIG. 3 example, item occurrence data 306 is present in or otherwise provided from one or more data sources 200. The item occurrence data 306 may include, e.g., one or more of file system data, network statistics, processor statistics, peripheral usage statistics, memory usage statistics, message statistics, or other usage data or item instance statistics maintained routinely by a kernel or performance profiler tool. The occurrence data 306 is used to obtain occurrence distributions 322, such as leading digit occurrence distributions 322, which are compared to model distributions, such as Benford distributions. However, the occurrence data 306 is not itself strictly part of the attack detection technology 318.

Some embodiments provide or use a computing system 302 equipped with attack detection technology 318 for detecting multiple different types of computer security attacks. This computing system includes at least one machine 304, with each such machine including at least one processor 110 and a memory 112 in operable communication with the processor. The memory 112 includes at least one of the following: a volatile memory portion 242, a non-volatile memory portion 246.

This computing system 302 also includes multiple data sources 200, with each data source including digital item occurrence data 306 residing in the memory of a particular machine and representing occurrences of instances in the machine of digital items 328 of a particular digital item type. Digital items include, e.g., file names 208, file extensions 210, file type IDs 212, ports 218, messages 250, and the many other items in the computing system for which instance data is maintained, e.g., as entries in data records 204. For convenience, digital item types are also referred to herein with reference numeral 328; it is clear to one of skill in the art from context whether a particular digital item or a set of digital items of a particular type is referenced.

This computing system 302 also includes multiple model distributions 308, with each model distribution corresponding to a respective data source.

This computing system 302 also includes a list 310 (i.e., group, set, or other enumeration) of security attack types 312, which in this example includes at least two of the following: a ransomware attack type 402, a distributed denial of service attack type 404, a bitcoin mining attack type 406, a phishing attack type 410, or a SQL injection attack type 412.

This computing system 302 also includes a mapping 314 between the security attack types and the data sources. Under the mapping, each security attack type corresponds with one or more respective data sources. In this example, each security attack type listed above (402, 404, 406, 410, 412) corresponds to at least one data source that does not correspond to at least one other security attack type listed above. In an alternative example, no two listed security attack types have exactly the same data source(s).

This computing system 302 also includes an attack detection engine 320 having instructions 116 which upon execution by the processor(s) 110 perform operations that get 606 a selection 608 of a security attack type, obtain 504 an item occurrence distribution 322 from occurrence data 306 of a data source 200 that corresponds to the selected security attack type, check 506 the item occurrence distribution for departure from the model distribution 308 for the data source, and raise 510 a security attack alert 512 when the item occurrence distribution departs from the model distribution by at least a predefined degree 518.

Some embodiments provide or use a computing system 302 as described, wherein the digital item 328 types of the data sources collectively include at least two of the following: process events or thread events or both, GPU usage measurements, non-GPU processor usage measurements, volatile memory portion usage measurements, non-volatile memory portion usage measurements, file system statistics, or measurements of usage of a specified set of human-readable strings. Events, usage measurements, and other occurrence data can be obtained, e.g., using routines utilized in administrator tools, performance tools, or utilities, e.g., Event Viewer, Performance Monitor, Task Manager, and the like in Microsoft Windows® environments, and mpstat, iostat, vmstat, sysstat, and the like in UNIX®-like environments (Windows® is a mark of Microsoft Corporation; UNIX® is a mark of X/Open Co. Ltd. Corp.).

Some embodiments provide or use a computing system 302 as described, wherein the computing system includes at least a first machine 304 and a second machine 304, with each machine having a respective data source 200 and corresponding model distribution 308. In this example, the attack detection engine 320 checks 506 for departure from model distribution on the first machine and also checks 506 for departure from model distribution on the second machine, and then raises 510 the security attack alert when departure is found on both machines. In an alternative, the alert is raised 510 when departure is found on either machine.

Some embodiments provide or use a computing system 302 as described, wherein the model distributions include at least one logarithmic distribution of leading digits consistent with Benford's Phenomenon. In some of these, a single leading digit is used when forming the occurrence distribution, and in other cases a leading pair of digits is used when forming the occurrence distribution, and in still other cases a leading N-tuple of digits, N>2, is used when forming the occurrence distribution.

Some embodiments provide or use a computing system 302 as described, wherein the computing system includes multiple machines 304 in a cloud computing environment 100 which contains a security center 326 that provides administrative oversight of security monitoring across multiple machines. In this example, the attack detection engine 320 operates to raise 510 the security attack alert at least in part by sending a communication 324 containing the alert 512 to the security center.

Some embodiments provide or use a computing system 302 as described, wherein the computing system includes at least one of the following: a file storage and synchronization service 706, a file hosting service 704, or a cloud service 702.

Some embodiments provide or use a computing system 302 as described, wherein the mapping 314 between the security attack types 312 and the data sources 200 implements at least two of the following correspondences: ransomware attack type 402 corresponds with file extension 210 occurrence data source, distributed denial of service attack type 404 corresponds with IP address connection occurrence data source 216, distributed denial of service attack type 404 corresponds with port connection occurrence data source 218, bitcoin mining attack type 406 corresponds with GPU usage measurements data source 232, bitcoin mining attack type 406 corresponds with GPU usage measurements data source 232 and game play peripheral usage data source 234, phishing attack type 410 corresponds with email text string data source 256, SQL injection attack type 412 corresponds with URL text string data source 260, a breach attack type 414 corresponds with an event type data source 214, 224, or 236, a breach attack type 414 corresponds with a performance counter data source 224.

Methods

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 6:
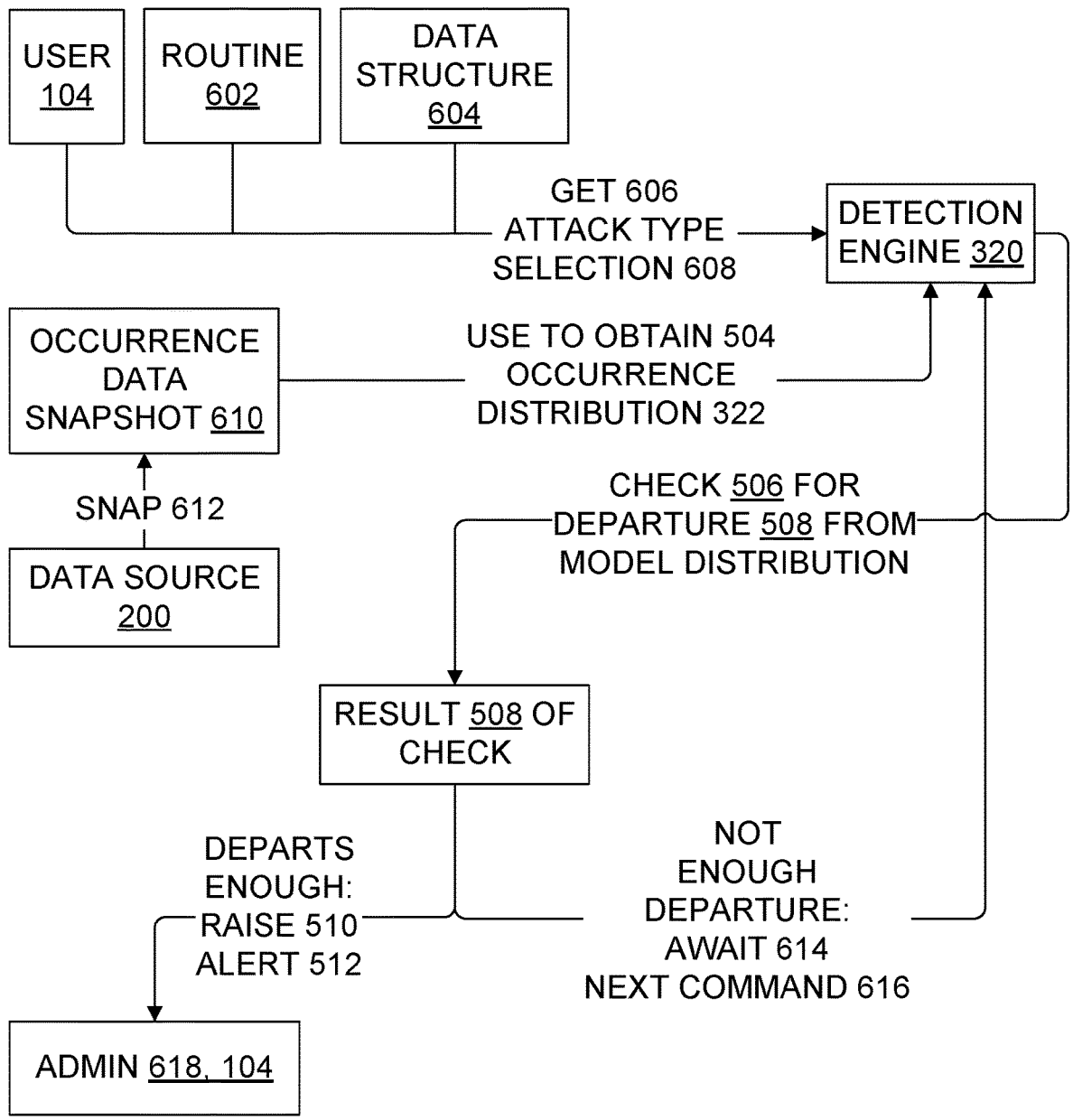
FIG. 6 is a flow diagram illustrating another method for detecting attacks on computer system security.
Figure 7:
FIG. 7 is a block diagram illustrating examples of particular computing system services.
Figure 8:
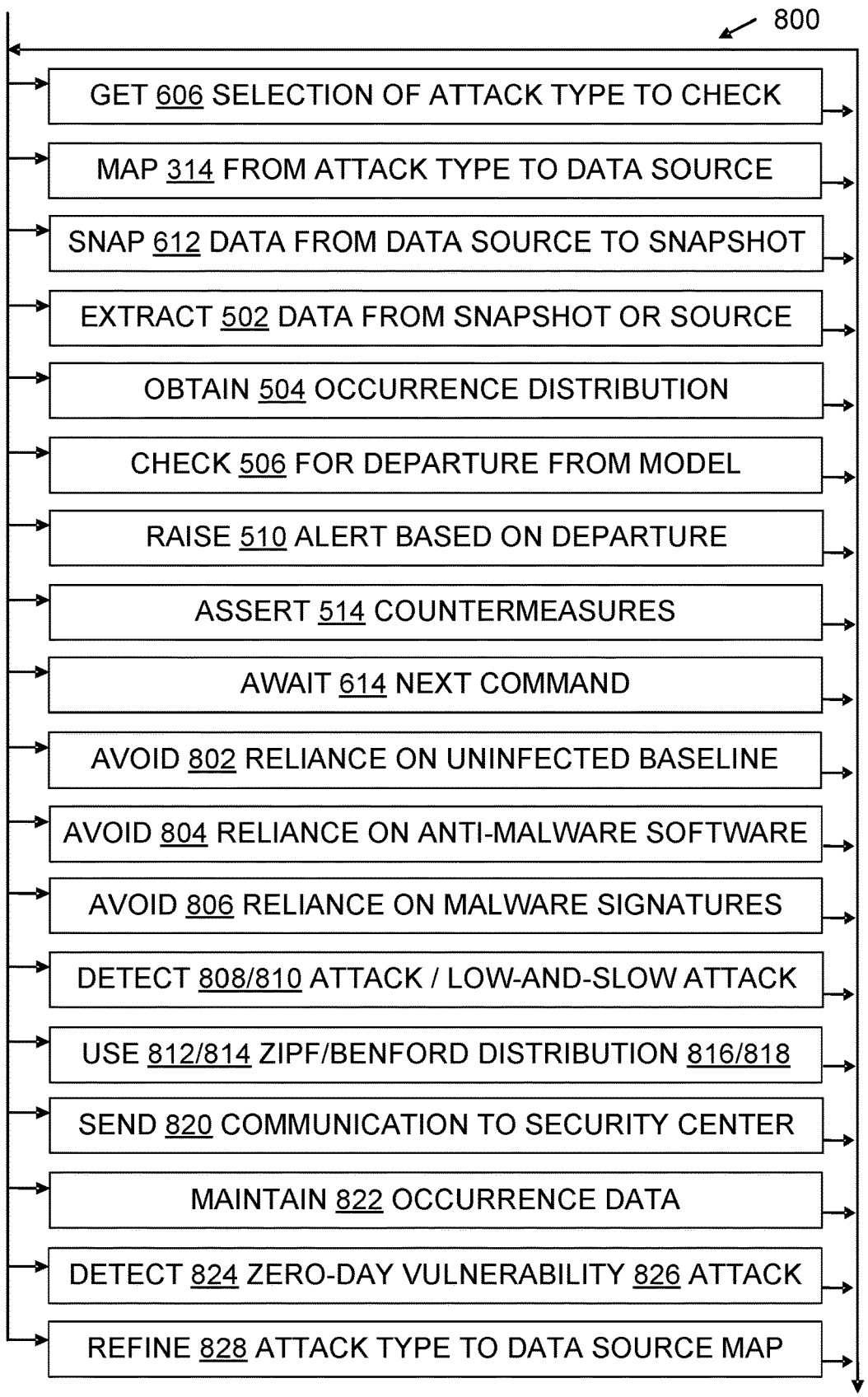
FIG. 8 is flow chart further illustrating aspects of some process and configured storage medium technologies for detecting and responding to attacks on computer security.

FIGS. 5, 6, and 8 illustrate some method embodiments in a flowchart 500, a data flow diagram 600, and another flowchart 800, respectively.

As shown in FIG. 5, some attack detection methods extract 502 occurrence data 306, obtain 504 an occurrence distribution 322 from the occurrence data, and then check 506 the occurrence distribution to see whether it departs sufficiently from the model distribution 308 for the attack type in question to raise 510 an alert 512. If the departure 508 is large enough, according to a predefined threshold, the alert is raised. Countermeasures 516 may also be asserted 514, e.g., by suspending normal user access to the computational resources involved. If the departure 508 does not exceed the predefined threshold, then control returns to the top of the method.

As shown in FIG. 6, some attack detection methods get 606 a selection 608 indicating which attack type to check for. In this example, the attack detection engine 320 then extracts occurrence data from a previously snapped 612 data snapshot 610, obtains 504 an occurrence distribution 322 from the occurrence data, and then checks 506 the occurrence distribution to see whether it departs sufficiently from the model distribution for the attack type in question to raise 510 an alert 512 with an administrator 618. If the departure is not large enough to raise an alert, then the attack detection engine awaits 614 its next command 616.

FIG. 8 illustrates some method embodiments in a general flowchart 800. Technical methods shown in the Figures or otherwise disclosed will be performed automatically, e.g., by an attack detection engine 320, unless otherwise indicated. Methods may also be performed in part automatically and in part manually to the extent action by a human administrator or other human person is implicated, e.g., a person may command that a check 506 be performed. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a computer-implemented method attack detection method for improved computer security technology, namely, for improved automated detection of attacks on the security of a computing system, with the attack detection method including electronically extracting 502, from one or more data records 204 maintained by one or more kernels 120 of the computing system, digital item occurrence data 306 which represents occurrences of instances of digital items 328 in the computing system. This method also includes obtaining 504, by execution of processor instructions, an item occurrence distribution 322 from the occurrence data. In this example, the occurrence distribution 322 is not the distribution of digital items but is rather a distribution of leading digit N-tuples (N>0) in the tally of instances of the various digital items. This method also includes checking 506, by execution of processor 110 instructions, the item occurrence distribution for a departure 508 from a model distribution 308 for a type X 312 of computer security attacks. This method also includes electronically raising 510 a security attack alert 512 when the item occurrence distribution departs from the model distribution by at least a predefined degree 518. In this example, the security attack alert indicates the presence of indicia (namely, the distributions and the departure) of a type X security attack on the computing system.

In some cases, the attack detection method is further characterized by at least one of the following developments in automated detection of computer security attacks:
(a) the attack detection method raises the security attack alert without relying 802 on baseline item occurrence data obtained from a healthy uninfected computing system, namely, from a computing system that is free of malware;
(b) the attack detection method raises the security attack alert without relying 804 on direct communication with any anti-malware software installed on the computing system;
(c) the attack detection method raises the security attack alert without relying 806 on any database of malware code signatures;
(d) the attack detection method detects 810 a previously undetected low and slow attack on the security of the computing system.

Some embodiments use or provide an attack detection method as described, wherein the type X 312 of computer security attacks includes ransomware attacks 402, and the extracting extracts data which represents occurrences of instances of file types (210, 212, or both) in the computing system. In some cases, only file extensions 210 are considered as instances of file types, because the file system does not support file type IDs 212.

Some embodiments use or provide an attack detection method as described, wherein the type X 312 of computer security attacks includes distributed denial of service attacks 404, and the extracting extracts data which represents occurrences of instances of connections per IP address 216 in the computing system, or connections per port 218 in the computing system, or both.

Some embodiments use or provide an attack detection method as described, wherein the type X 312 of computer security attacks includes bitcoin mining attacks 406, and the extracting extracts data which represents occurrences of instances of GPU usage 232 in the computing system.

Some embodiments use or provide an attack detection method as described, wherein the type X 312 of computer security attacks includes processing theft attacks 408, and the extracting extracts data which represents occurrences of instances of processor usage 224 in the computing system.

Some embodiments use or provide an attack detection method as described, wherein the type X 312 of computer security attacks includes phishing attacks 410, and the extracting extracts data which represents occurrences of instances of text strings 256 in email in the computing system.

Some embodiments use or provide an attack detection method as described, wherein the type X 312 of computer security attacks includes SQL injection attacks 412, and the extracting extracts data which represents occurrences of instances of malicious character sequences 260 in user submitted messages in the computing system.

Some embodiments use or provide an attack detection method as described, wherein the method raises 510 a security attack alert based on the departure of at least two distributions 322 which are obtained from at least two respective data sources 200, each obtained distribution departing 508 from a respective model distribution 308. In this example, the method extracts 502 data from at least two of the following data sources in the computing system: event occurrence statistics 224, 234, 236 maintained by a kernel, GPU usage statistics 232, non-GPU processor usage statistics 228, working memory usage statistics 240, non-volatile memory usage statistics 248, networking statistics 214, or file system statistics 262.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a list 310 of security attack types, a mapping 314 between attack types and data sources, a model distribution 308, and attack detection software 316, in the form of data 118 and instructions 116, read from a removable medium 114 and/or another source such as a network connection, to form a configured medium. The configured medium 112 is capable of causing a computer system to perform technical process steps for adjusting list content density 1010 as disclosed herein. The Figures thus help illustrate configured storage media embodiments and process embodiments, as well as system and process embodiments. In particular, any of the process steps illustrated in FIG. 11, FIG. 12, or otherwise taught herein, may be used to help configure a storage medium to form a configured medium embodiment.

Some examples use or provide a computer-readable storage medium 112 configured with data 118 and instructions 116 which upon execution with a processor 110 perform an attack detection method in a computing system, the method including getting 606 from a user 104 or from a software routine 602 or from a software data structure 604 a selection 608 of a security attack type 312 from a group 310 which includes at least two of the following: a ransomware attack type 402, a distributed denial of service attack type 404, a bitcoin mining attack type 406, a phishing attack type 410, a processing theft attack type 408, or a SQL injection attack type 412.

This method also includes obtaining 504 an item occurrence distribution 322 from a snapshot 610 of occurrence data 306 that was snapped 612 at a given point in time from a data source 200 that corresponds to the selected security attack type. In this example, the data source is chosen (i.e., selected) from a group which includes at least two of the following: event type occurrence data maintained by a kernel 120, GPU usage measurements, non-GPU processor usage measurements, memory usage measurements, networking statistics, email statistics, SQL statistics, or file system statistics.

This method also includes checking 506 the item occurrence distribution for departure 508 from a model distribution 308 for the data source. In this example, the model distribution conforms with Zipfs Phenomenon.

This method also includes raising 510 a security attack alert 512 when the item occurrence distribution departs from the model distribution by at least a predefined degree.

Some examples use or provide a computer-readable storage medium 112 configured with data 118 and instructions as described, and wherein the obtaining is based on at least one of the following correspondences (i.e., mappings):
the ransomware attack type corresponds with file system statistics in the form of file extension occurrence data;
the distributed denial of service attack type corresponds with networking statistics in the form of IP address connection occurrence data;
the distributed denial of service attack type corresponds with networking statistics in the form of port connection occurrence data;
the bitcoin mining attack type corresponds with GPU usage measurements;
the phishing attack type corresponds with email statistics in the form of email text string occurrence data;
the SQL injection attack type corresponds with SQL statistics in the form of URL text string data;
the processing theft attack type corresponds with non-GPU processor usage measurements; or
the processing theft attack type corresponds with memory usage measurements.

Some examples use or provide a computer-readable storage medium 112 configured with data 118 and instructions as described, wherein the obtaining snaps 612 occurrence data that is maintained 822 by a kernel 120 regardless of whether attack detection method instructions are installed on the computing system, as opposed to the method relying on gathering of the occurrence data by software that is designed specifically for attack detection.

Some examples use or provide a computer-readable storage medium 112 configured with data 118 and instructions as described, wherein the computing system is infected by malware and the method nonetheless detects 808 a security attack on the computing system. An advantage of the present method is that a baseline of captured normal activity is not required to detect attacks.

Some examples use or provide a computer-readable storage medium 112 configured with data 118 and instructions as described, wherein the method detects 824, 808 a security attack which is based on a zero-day vulnerability 826. An advantage of the present method is that a database of malware signatures (which is often not available for newly created zero-day exploits) is not required to detect attacks.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

More generally, described technologies 318 automatically detect 808 computing system security attacks. Departure 508 of occurrence distributions 322, which are based on leading digit(s) of digital item occurrence data 306, from model distributions 308 that correspond to particular data sources 200, indicates a presence likelihood for particular attack types 312, in that larger departures 508 indicate a greater likelihood that the attack in question is present in the computing system. Some model distributions 308 exhibit Benford's Phenomenon. Described mechanisms detect security attack types such as ransomware 402, bitcoin mining 406, and others, using particular corresponding data sources such as file extensions 210, processor statistics 224, etc. Mechanisms detect security attacks without 802 a captured baseline of actual normal behavior, and without 806 relying on malware code signatures. When an item occurrence distribution departs from a model distribution by at least a predefined degree 518, the technology electronically raises 510 a security attack alert 512. Then countermeasures 516 may be asserted for a possible type X security attack on the computing system. Countermeasures may include more computationally intensive tests for determining the precise extent or precise nature of an attack, for instance.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 5, 6, and 8 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An attack detection method for improved computer security technology, namely, for improved automated detection of attacks on the security of a computing system, the attack detection method comprising:

electronically extracting, from one or more data records maintained by one or more kernels of the computing system, digital item occurrence data which represents occurrences of instances of digital items in the computing system;

obtaining, by execution of processor instructions, an item occurrence distribution from the occurrence data, wherein the item occurrence distribution includes a distribution of leading digit N-tuples (N>0) in the occurrence data;

checking, by execution of processor instructions, the item occurrence distribution for departure from a model distribution for a type X of computer security attacks, the model distribution conforming with Zipf's Phenomenon; and asserting an attack countermeasure when the item occurrence distribution departs from the model distribution by at least a predefined degree, a security attack alert indicating the presence of indicia of a type X security attack on the computing system;

wherein the attack detection method is further characterized by at least one of the following developments in automated detection of computer security attacks:

(a) the attack detection method raises the security attack alert without relying on baseline item occurrence data obtained from a healthy uninfected computing system, namely, from a computing system that is free of malware;

(b) the attack detection method raises the security attack alert without relying on direct communication with any anti-malware software installed on the computing system;

(c) the attack detection method raises the security attack alert without relying on any database of malware code signatures;

(d) the attack detection method detects a previously undetected low and slow attack on the security of the computing system.

2. The attack detection method of claim 1, wherein the type X of computer security attacks includes ransomware attacks, and the extracting extracts data which represents occurrences of instances of file types in the computing system.

3. The attack detection method of claim 1, wherein the type X of computer security attacks includes distributed denial of service attacks, and the extracting extracts data which represents occurrences of instances of connections per IP address in the computing system, or connections per port in the computing system, or both.

4. The attack detection method of claim 1, wherein the type X of computer security attacks includes bitcoin mining attacks, and the extracting extracts data which represents occurrences of instances of GPU usage in the computing system.

5. The attack detection method of claim 1, wherein the type X of computer security attacks includes processing theft attacks, and the extracting extracts data which represents occurrences of instances of processor usage in the computing system.

6. The attack detection method of claim 1, wherein the type X of computer security attacks includes phishing attacks, and the extracting extracts data which represents occurrences of instances of text strings in email in the computing system.

7. The attack detection method of claim 1, wherein the type X of computer security attacks includes SQL injection attacks, and the extracting extracts data which represents occurrences of instances of malicious character sequences in user submitted messages in the computing system.

8. The attack detection method of claim 1, wherein the method raises a security attack alert based on the departure of at least two distributions which are obtained from at least two respective data sources, each obtained distribution departing from a respective model distribution, and wherein the method extracts data from at least two of the following data sources in the computing system: event occurrence statistics maintained by a kernel, GPU usage statistics, non-GPU processor usage statistics, working memory usage statistics, non-volatile memory usage statistics, networking statistics, or file system statistics.

9. A computing system equipped with attack detection technology for detecting multiple different types of computer security attacks, the computing system comprising:
at least one machine, each machine comprising:
at least one processor;
a memory in operable communication with the processor, the memory comprising at least one of the following: a volatile memory portion, a non-volatile memory portion;
multiple data sources, each data source comprising digital item occurrence data residing in the memory of a particular machine and representing occurrences of instances in the machine of digital items of a particular digital item type;
multiple model distributions, each model distribution corresponding to a respective data source;
a list of security attack types comprising at least two of the following: a ransomware attack type, a distributed denial of service attack type, a bitcoin mining attack type, a phishing attack type, or a SQL injection attack type;
a mapping between the security attack types and the data sources, whereby each security attack type corresponds with one or more respective data sources, and each security attack type listed above corresponds to at least one data source that does not correspond to at least one other security attack type listed above; and
an attack detection engine having instructions which upon execution by the processor(s) perform operations that get a selection of a security attack type, obtain an item occurrence distribution from occurrence data of a data source that corresponds to the selected security attack type, the item occurrence distribution including a distribution of leading digit N-tuples (N>0) in the occurrence data, check the item occurrence distribution for departure from the model distribution for the data source, the model distribution conforming with Zipf's Phenomenon, and assert an attack countermeasure when the item occurrence distribution departs from the model distribution by at least a predefined degree.

10. The computing system of claim 9, wherein the digital item types of the data sources collectively include at least two of the following: process events or thread events or both, GPU usage measurements, non-GPU processor usage measurements, volatile memory portion usage measurements, non-volatile memory portion usage measurements, file system statistics, or measurements of usage of a specified set of human-readable strings.

11. The computing system of claim 9, wherein the computing system comprises at least a first machine and a second machine, each machine having a respective data source and corresponding model distribution, and wherein the attack detection engine checks for departure from model distribution on the first machine and also checks for departure from model distribution on the second machine, and raises a security attack alert when departure is found on both machines.

12. The computing system of claim 9, wherein the model distributions comprise at least one logarithmic distribution of leading digits consistent with Benford's Phenomenon.

13. The computing system of claim 9, wherein the computing system comprises multiple machines in a cloud computing environment which contains a security center that provides administrative oversight of security monitoring across multiple machines, and the attack detection engine operates to raise a security attack alert at least in part by sending a communication to the security center.

14. The computing system of claim 9, wherein the computing system comprises at least one of the following: a file storage and synchronization service, a file hosting service, a cloud service.

15. The computing system of claim 9, wherein the mapping between the security attack types and the data sources implements at least two of the following correspondences: ransomware attack type corresponds with file extension occurrence data source, distributed denial of service attack type corresponds with IP address connection occurrence data source, distributed denial of service attack type corresponds with port connection occurrence data source, bitcoin mining attack type corresponds with GPU usage measurements data source, bitcoin mining attack type corresponds with GPU usage measurements data source and game play peripheral usage data source, phishing attack type corresponds with email text string data source, SQL injection attack type corresponds with URL text string data source, a breach attack type corresponds with an event type data source, a breach attack type corresponds with a performance counter data source.

16. A computer-readable storage medium configured with instructions which upon execution by one or more processors perform an attack detection method in a computing system, the method comprising:
getting from a user or from a software routine or from a software data structure a selection of a security attack type from a group which includes at least two of the following: a ransomware attack type, a distributed denial of service attack type, a bitcoin mining attack type, a phishing attack type, a processing theft attack type, or a SQL injection attack type;
obtaining an item occurrence distribution from a snapshot of occurrence data that was snapped at a given point in time from a data source that corresponds to the selected security attack type, wherein the data source is chosen from a group which includes at least two of the following: event type occurrence data maintained by a kernel, GPU usage measurements, non-GPU processor usage measurements, memory usage measurements, networking statistics, email statistics, SQL statistics, or file system statistics, wherein the item occurrence distribution includes a distribution of leading digit N-tuples (N>0) in the occurrence data;

checking the item occurrence distribution for departure from a model distribution for the data source, wherein the model distribution conforms with Zipf's Phenomenon; and asserting an attack countermeasure when the item occurrence distribution departs from the model distribution by at least a predefined degree.

17. The computer-readable storage medium of claim 16, wherein the obtaining is based on at least one of the following correspondences:

the ransomware attack type corresponds with file system statistics in the form of file extension occurrence data;

the distributed denial of service attack type corresponds with networking statistics in the form of IP address connection occurrence data;

the distributed denial of service attack type corresponds with networking statistics in the form of port connection occurrence data;

the bitcoin mining attack type corresponds with GPU usage measurements;

the phishing attack type corresponds with email statistics in the form of email text string occurrence data;

the SQL injection attack type corresponds with SQL statistics in the form of URL text string data;

the processing theft attack type corresponds with non-GPU processor usage measurements; or the processing theft attack type corresponds with memory usage measurements.

18. The computer-readable storage medium of claim 16, wherein the obtaining snaps occurrence data that is maintained by a kernel regardless of whether attack detection method instructions are installed on the computing system, as opposed to the method relying on gathering of the occurrence data by software that is designed specifically for attack detection.

19. The computer-readable storage medium of claim 16, wherein the computing system is infected by malware and the method nonetheless detects a security attack on the computing system.

20. The computer-readable storage medium of claim 16, wherein the method detects a security attack which is based on a zero-day vulnerability.

\* \* \* \* \*